(12) United States Patent
Landmark (10) Patent No.: US 10,456,858 B2
(45) Date of Patent: Oct. 29, 2019

(54) WELDING HEAD FOR FRICTION STIR WELDING (71) Applicant: ESAB AB, Göteborg (SE)

(72) Inventor: Åke Landmark, Askersund (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 15/941,092

(22) Filed: Mar. 30, 2018

(65) Prior Publication Data
US 2019/0299325 A1 Oct. 3, 2019

(51) Int. Cl.
B23K 20/12 (2006.01)
(52) U.S. Cl.
CPC .......... B23K 20/125 (2013.01); B23K 20/123 (2013.01)
(58) Field of Classification Search
CPC . B23K 20/122; B23K 20/1255; B23K 20/127
See application file for complete search history.

(56) References Cited

U.S. PATENT DOCUMENTS

| | | | |
|---|---|---|---|
| 5,460,317 A | 10/1995 | Thomas et al. | |
| 6,050,475 A | 4/2000 | Kinton et al. | |
| 6,497,355 B1 | 12/2002 | Ding et al. | |
| 6,732,900 B2 | 5/2004 | Hansen et al. | |
| 7,448,526 B2 | 11/2008 | Haynie et al. | |
| 7,451,661 B2 | 11/2008 | burton et al. | |
| 7,571,654 B2 | 8/2009 | Burton et al. | |
| 7,654,435 B2 | 2/2010 | Kumagai et al. | |
| 7,707,893 B2 | 5/2010 | Johansson et al. | |
| 7,850,057 B2 | 12/2010 | Fleming et al. | |
| 8,052,028 B2 | 11/2011 | Hall et al. | |
| 8,052,034 B2 | 11/2011 | Fleming et al. | |
| 8,079,276 B2 | 12/2011 | Sylva et al. | |
| 8,191,753 B2 | 6/2012 | Fleming et al. | |
| 8,261,959 B2 | 9/2012 | Cruz et al. | |
| 8,714,431 B2 | 5/2014 | Roos et al. | |
| 2007/0152015 A1* | 7/2007 | Burton | B23K 20/1255 228/2.1 |
| 2014/0067286 A1* | 3/2014 | Castillo | B23K 31/00 702/41 |
| 2017/0216960 A1 | 8/2017 | Sayama | |

* cited by examiner

Primary Examiner — Erin B Saad
(74) Attorney, Agent, or Firm — Edell, Shapiro & Finnan, LLC (57) ABSTRACT The friction stir welding head presented herein includes a head housing and an axle. The head housing extends from a top end to an open bottom end and defines a bore extending between the top end and the open bottom end. The axle that is coaxial with and rotatable within the bore. The axle is also laterally secured within the head housing and axially movable with respect to the head housing. Still further, the axle includes an engagement end that extends beyond the open bottom end of the head housing. The engagement end supports a friction stir welding tool that is configured to rotate with the axle to effectuate friction stir welding operations. The friction stir welding head may also include a load cell configured to generate load signals in response to axial movement of the axle.

18 Claims, 8 Drawing Sheets

WELDING HEAD FOR FRICTION STIR WELDING

TECHNICAL FIELD

The present disclosure is directed towards a welding head for friction stir welding (FSW) and, in particular, a compact FSW head with improved axial force measurement.

BACKGROUND

Friction stir welding (FSW) is a welding process which uses heat generated from high-pressure friction to form a joint between two workpieces and/or to fix cracks in a workpiece. That is, during FSW operations, an FSW tool traverses a joint or seam disposed between the workpieces (or a crack in a workpiece) and the workpiece(s) are plasticized by frictional heat generated by rotation of the FSW tool. As the FSW tool traverses the seam, the FSW tool is also pressed against the workpieces, which are fixed relative to each other during the welding operation. More specifically, an FSW tool includes a shoulder and a pin or probe that extends out from the shoulder. During the welding operation, the shoulder is pressed against the workpiece(s) and the pin rotates in the seam between the workpieces (or in a crack in a workpiece). In some FSW heads, the shoulder rotates with or relative to the pin, but in other FSW heads, the shoulder may be stationary. Rotation of the pin (and the shoulder in some instances), softens and mixes the materials forming the workpieces. Then, the mixed materials consolidate to form a solid-state weld.

The FSW tool can traverse a seam (or crack) when the welding tool moves relative to the workpiece(s) and/or when the workpiece(s) are moved relative to the welding tool (e.g., the welding tool may be stationary). Regardless, during FSW, the welding tool must be pressed against the workpieces with great force to frictionally heat the workpieces enough to cause the desired plasticizing in the seam, and it is important to know the axial force acting on the tool and workpieces to properly calibrate and control the FSW operations (and perhaps, to adjust a backing) to provide high-quality welds. Thus, typically, FSW heads include a force measuring sensor, such as a load cell, and it is important that the force measuring sensor provides accurate data.

SUMMARY

The present disclosure is directed towards a friction stir welding (FSW) head. According to one embodiment, the FSW head includes a head housing and an axle. The head housing extends from a top end to an open bottom end and defines a bore extending between the top end and the open bottom end. The axle is coaxial with and rotatable within the bore. The axle is also laterally secured within the head housing and axially movable with respect to the head housing. Still further, the axle includes an engagement end that extends beyond the open bottom end of the head housing. The engagement end supports an FSW tool that is configured to rotate with the axle to effectuate FSW operations. Advantageously, the axial movement of the axle allows the axle to impart axial forces to a load cell disposed within or beneath the head housing. Additionally, the axial movement of the axle may allow the welding head to transition between rotating shoulder FSW and stationary shoulder FSW with a single operation.

In at least some of these embodiments, the FSW head also includes a motor assembly configured to rotate the axle within the bore and with respect to the head housing. Consequently, the FSW welding head may not need to be installed on a spindle or spindle actuator. Instead, the FSW head can be mounted on a robot, gantry, or any other carrier that moves the FSW head into place and supplies power to the motor assembly and the FSW head will supply its own rotational forces.

As mentioned, the FSW head may, in addition or as an alternative to the motor assembly, include a load cell configured to generate load signals in response to axial movement of the axle. In some of these embodiments, the load cell is disposed beneath the open bottom end of the head housing. Alternatively, the load cell may be disposed between the open bottom end of the head housing and the top end of the head housing. Advantageously, positioning the load cell in either of these positions the load cell close to the FSW tool which may increase the accuracy of the load signals. For example, if the load cell is positioned beneath the open bottom end of the head housing, axial forces exerted on the FSW tool may act nearly directly on the load cell.

As more specific examples, in some embodiments including a load cell, the load cell includes an inner ring and outer ring. The inner ring is fixedly coupled to the axle and movably coupled to the outer ring via a flexible portion, and relative movement of the inner ring with respect to the outer ring causes the load cell to generate the load signals. In some of these embodiments, the tool includes a pin and a shoulder that rotates with the pin to effectuate the FSW operations. Then, when upward forces act on the shoulder, the upward forces are translated to the inner ring to move the inner ring with respect to the outer ring and cause the load cell to generate the load signals. Specifically, in some embodiments, a lower bearing enables the axle to rotate with respect to the head housing and the lower bearing is either coupled to the inner ring via one or more floating components or formed with the inner ring and the one or more floating components, so that the upward forces on the shoulder translate to the inner ring via the lower bearing and the one or more floating components. Alternatively, in other embodiments, the tool includes a pin and a shoulder that is covered by a stationary shoulder. In these embodiments, upward forces on the stationary shoulder are translated to the inner ring to move the inner ring with respect to the outer ring and cause the load cell to generate the load signals. For example, the upward forces may translate directly from the stationary shoulder to the inner ring.

According to another embodiment, an FSW head includes a head housing, one or more floating components, and a load cell. The head housing extends from a top end to an open bottom end and defines a bore extending between the top end and the open bottom end. The one or more floating components are configured to support an FSW tool and the one or more floating components are axially movable with respect to the head housing. The load cell is disposed beneath the open bottom end of the head housing and configured to generate load signals in response to axial movement of the floating components. As mentioned, when the load cell is positioned beneath the head housing, the load cell is positioned close to the FSW tool which may increase the accuracy of load signals generated by the load cell. For example, if the load cell is positioned beneath the open bottom end of the head housing, axial forces exerted on the FSW tool may act nearly directly on the load cell. Moreover, when the load cell is positioned beneath the head housing and the FSW head includes one or more floating components, it may be relatively simple to switch between rotating shoulder FSW operations and stationary shoulder FSW operations.

In some of these embodiments, the one or more floating components include an axle that is coaxial with the bore, one or more bearings that allow rotation of the axle within the bore, and a connector ring that connects a particular bearing of the one or more bearings to the load cell. Additionally, the one or more floating components may include an inner ring of the load cell. The inner ring is fixedly coupled to the axle via at least the connector ring and is also movably coupled to an outer ring of the load cell via a flexible portion so that relative movement of the inner ring with respect to the outer ring causes the load cell to generate the load signals. Additionally or alternatively, the one or more floating components may include a rotor of a motor assembly. The rotor is movable by a stator that is fixedly coupled to the head housing to effectuate rotation of the axle within the bore. As mentioned, if the head includes a motor assembly (e.g., if the one or more floating components include a rotor of a motor assembly), the FSW welding head need not be installed on a spindle or spindle actuator. Instead, the FSW head can be mounted on a robot or gantry that moves the FSW head into place and supplies power to the motor assembly. The other components mentioned above may axially and longitudinally secure the axle within the head housing and ensure that axial forces acting on the axle are translated to the load cell.

In embodiments where the one or more floating components include one or more bearings that allow rotation of the axle within the bore, one bearing may be a lower bearing disposed between the load cell and a motor assembly included in the FSW head. In some of these embodiments, a supplemental bearing housing is disposed coaxially outward from the lower bearing and is accessible via an access panel included on the head housing. This may allow the lower bearing to be easily serviced and/or replaced, without disassembling other components of the FSW head.

Still further, in some embodiments, the FSW head is reconfigurable between a rotating shoulder configuration and a stationary shoulder configuration with a single installation operation. For example, a stationary shoulder housing may be simply coupled or decoupled to the head. This is advantageous because it allows for nearly seamless transition between these two types of FSW operations. By comparison, other FSW heads may need to be completely removed/replaced to effectuate such a change, which will not only be less efficient in terms of time, but also in terms of cost (the cost of acquiring and maintaining two FSW heads is likely to be much higher than the cost of acquiring one head and reconfiguring the head with a single operation).

According to yet another embodiment, a method of FSW is presented herein. The method includes providing a head housing that extends from a top end to an open bottom end and defines a bore extending between the top end and the open bottom end and installing a floating axle in the head housing. The floating axle includes an engagement end that extends beyond the open bottom end and supports an FSW tool. The method also includes installing a load cell on the open bottom end of the head housing and controlling FSW with the tool based on load signals generated by the load cell.

In some of these embodiments, the FSW is rotating shoulder FSW and the method further includes transitioning to stationary shoulder FSW by installing a stationary shoulder housing onto the load cell. In some of these embodiments, the stationary shoulder housing covers a shoulder of the FSW tool and the transitioning is complete with a single operation. That is, the no other components of the welding head, aside from the stationary shoulder housing, may need to be altered, removed, installed, etc. to effectuate the transition. As mentioned above, using a single, reconfigurable head may be more efficient in terms of time and cost as compared to using two heads for these two operations. This is especially true when the transitioning comprises a single operation.

BRIEF DESCRIPTION OF THE DRAWINGS

Like numerals identify like components throughout the figures.

DETAILED DESCRIPTION

A compact friction stir welding (FSW) head with improved axial force measurement (e.g., along an axial or vertical direction of the head) is provided herein. The FSW head provides improved downward force measurement because the FSW head includes a "floating" axle and a load cell that is disposed on a bottom of the head, adjacent an engagement end (e.g., a welding end) of the floating axle. The axle is "floating" because the axle can travel, at least slightly, in an axial direction (e.g., longitudinally or vertically) with respect to a main body or housing (also referred to herein as the head housing) of the FSW head. The position of the load cell and the range of longitudinal movement of the axle allow the load cell to accurately measure axial forces. Moreover, positioning the load cell at the bottom head and providing a floating axle creates a compact FSW head that is stiff, sturdy, and easy to service. These concepts can be utilized to create compact FSW heads of all sizes, with a rotating or stationary shoulder. In fact, in at least some embodiments, the FSW head presented herein can easily transition (e.g., with a single operation) between a rotating shoulder configuration and a stationary shoulder configuration.

Figure 3:
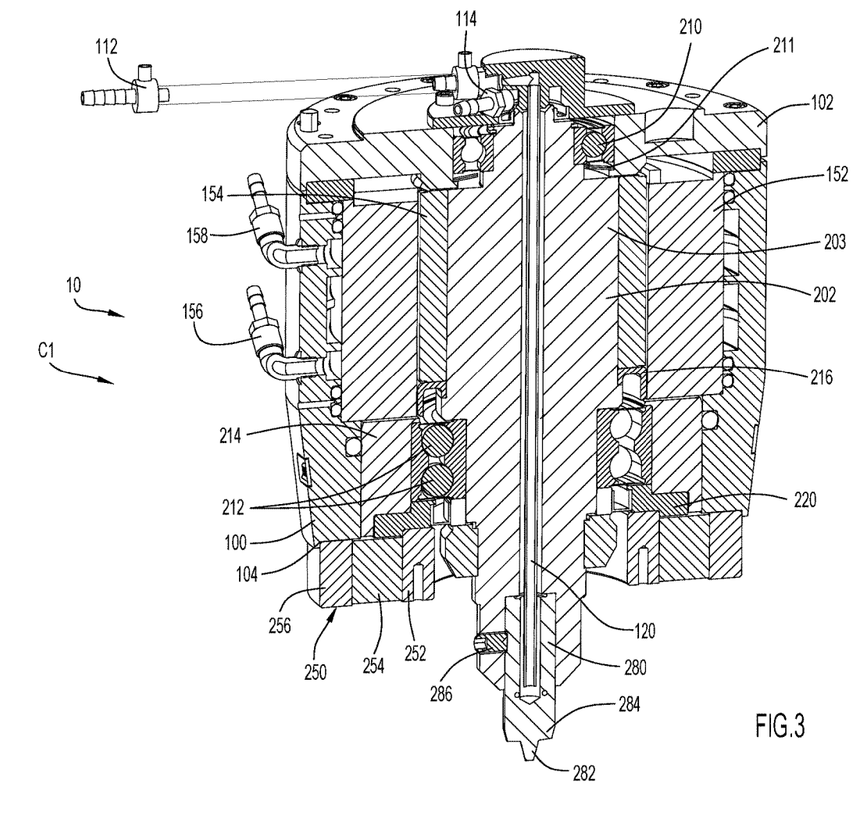
FIG. 3 is a sectional perspective view of the FSW head of FIG. 1.
Figure 4:
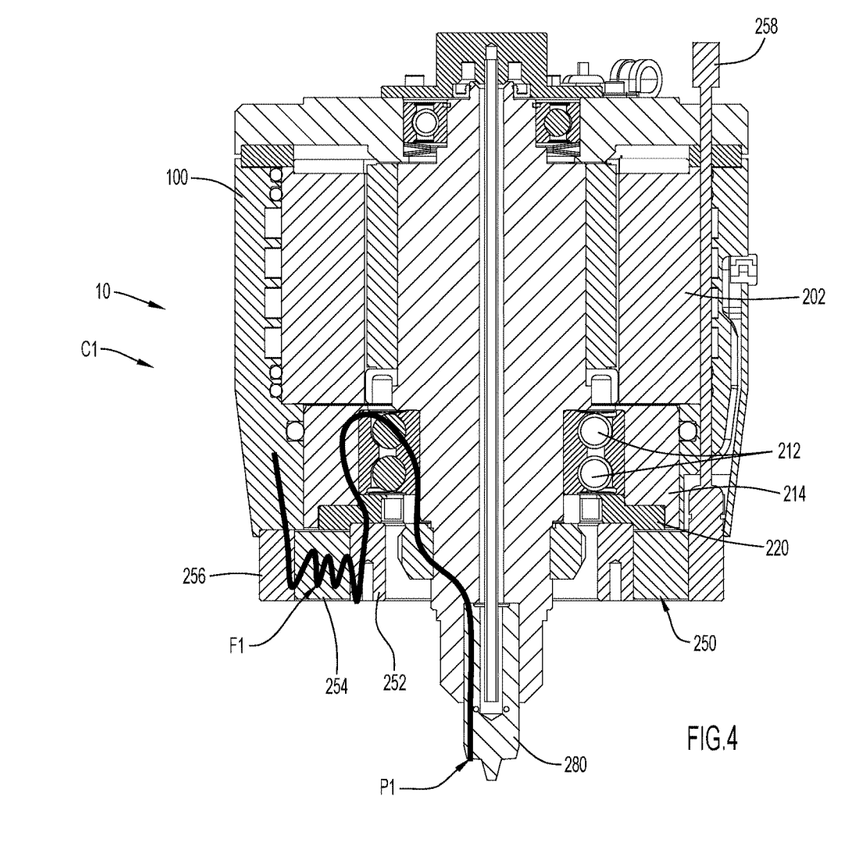
FIG. 4 is another sectional perspective view of the FSW head of FIG. 1 that illustrates a force path from a FSW tool included in the FSW head to a load cell included in the FSW head.
Figure 5:
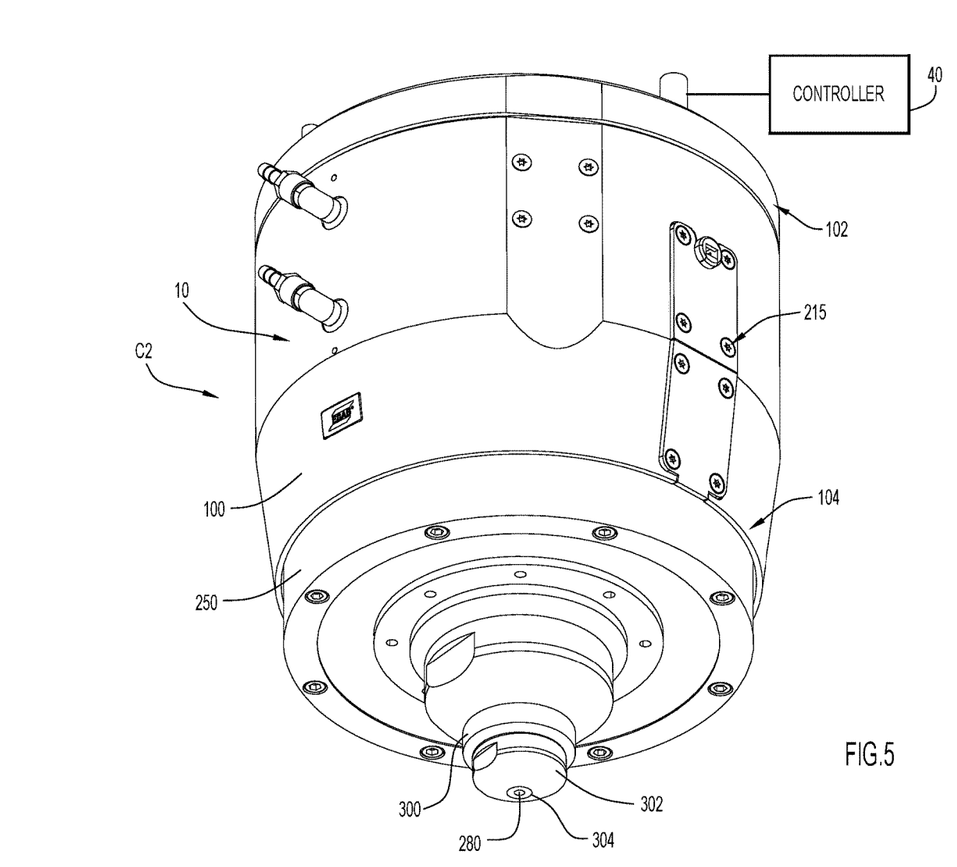
FIG. 5 is a side perspective view of the FSW head of FIG. 1 while reconfigured in accordance with a stationary shoulder configuration.
Figure 6:
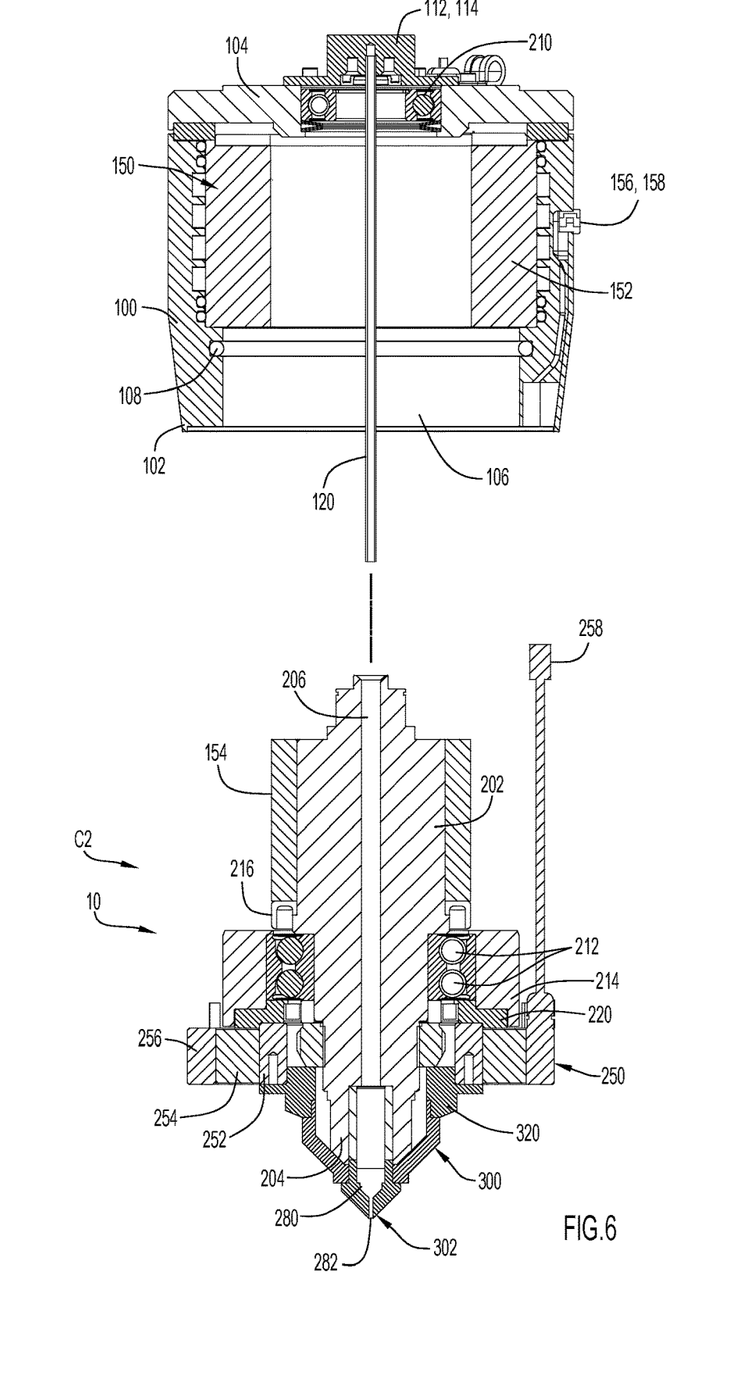
FIG. 6 is a partially exploded, sectional perspective view of the FSW head of FIG. 1 while in the stationary shoulder configuration shown in FIG. 5.
Figure 7:
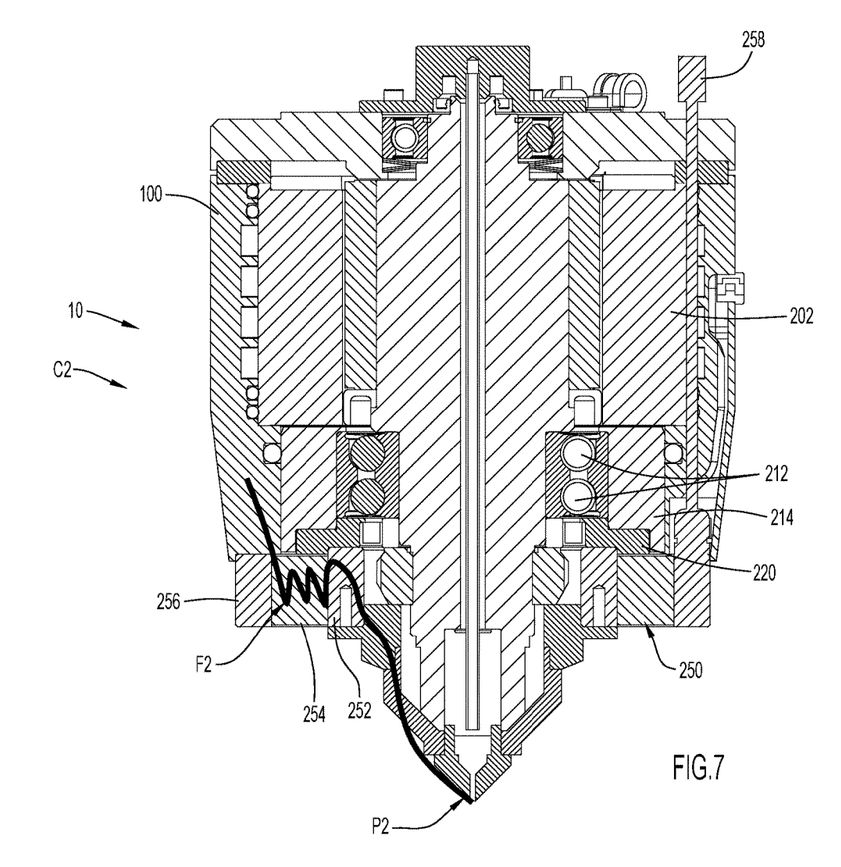
FIG. 7 is another sectional perspective view of the FSW head of FIG. 1 that illustrates a force path from the FSW tool to the load cell when the FSW head of FIG. 1 is in the stationary shoulder configuration shown in FIG. 5.

FIGS. 1-7 illustrate an FSW head 10 according to a first example embodiment. In FIGS. 1-4, the head 10 is shown in a rotating shoulder configuration C1. In FIGS. 5-7 the head 10 is shown in a stationary shoulder configuration C2. As is explained in further detail, the head 10 can transition between these configurations with a single operation, without disassembling the head 10. However, before turning to this aspect of the head 10, the head 10 is described in connection with FIGS. 1-4.

Figure 1:
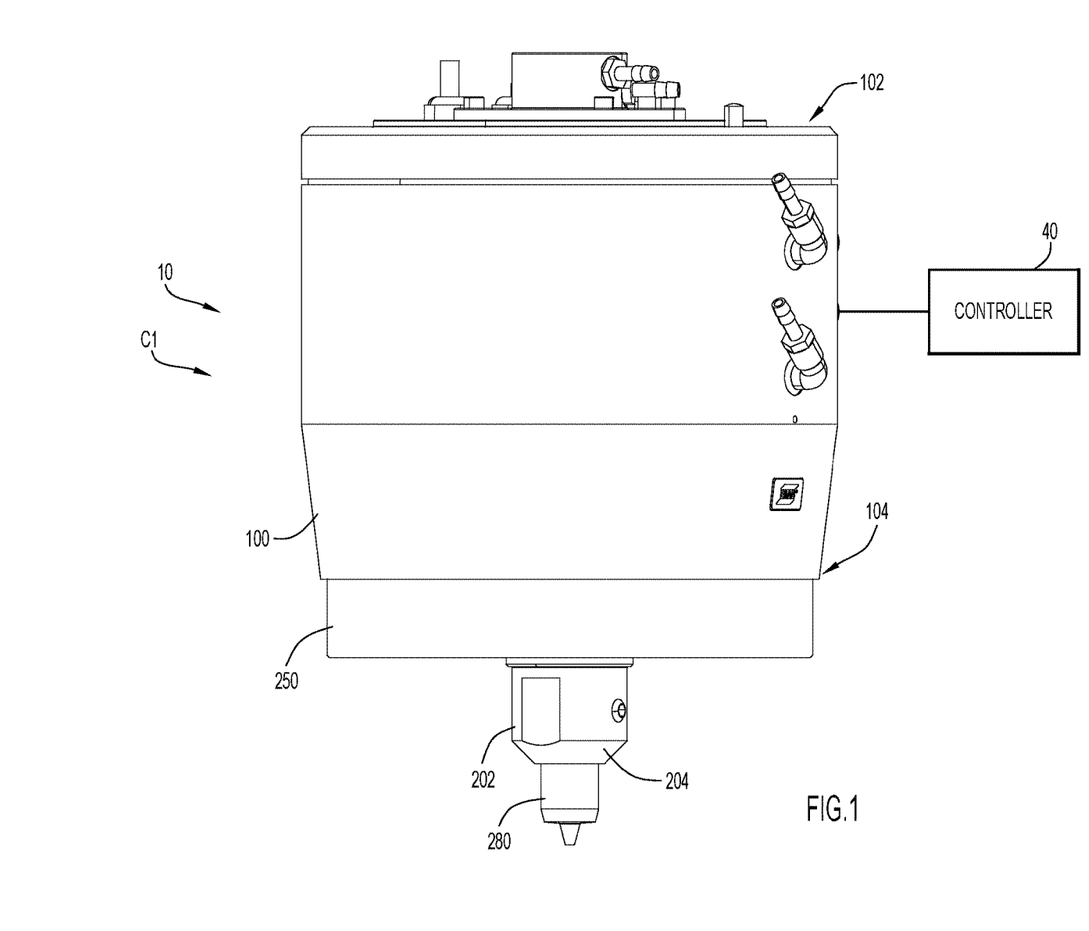
FIG. 1 is a side perspective view of a friction stir welding (FSW) head, according to a first example embodiment of the present disclosure.
Figure 2:
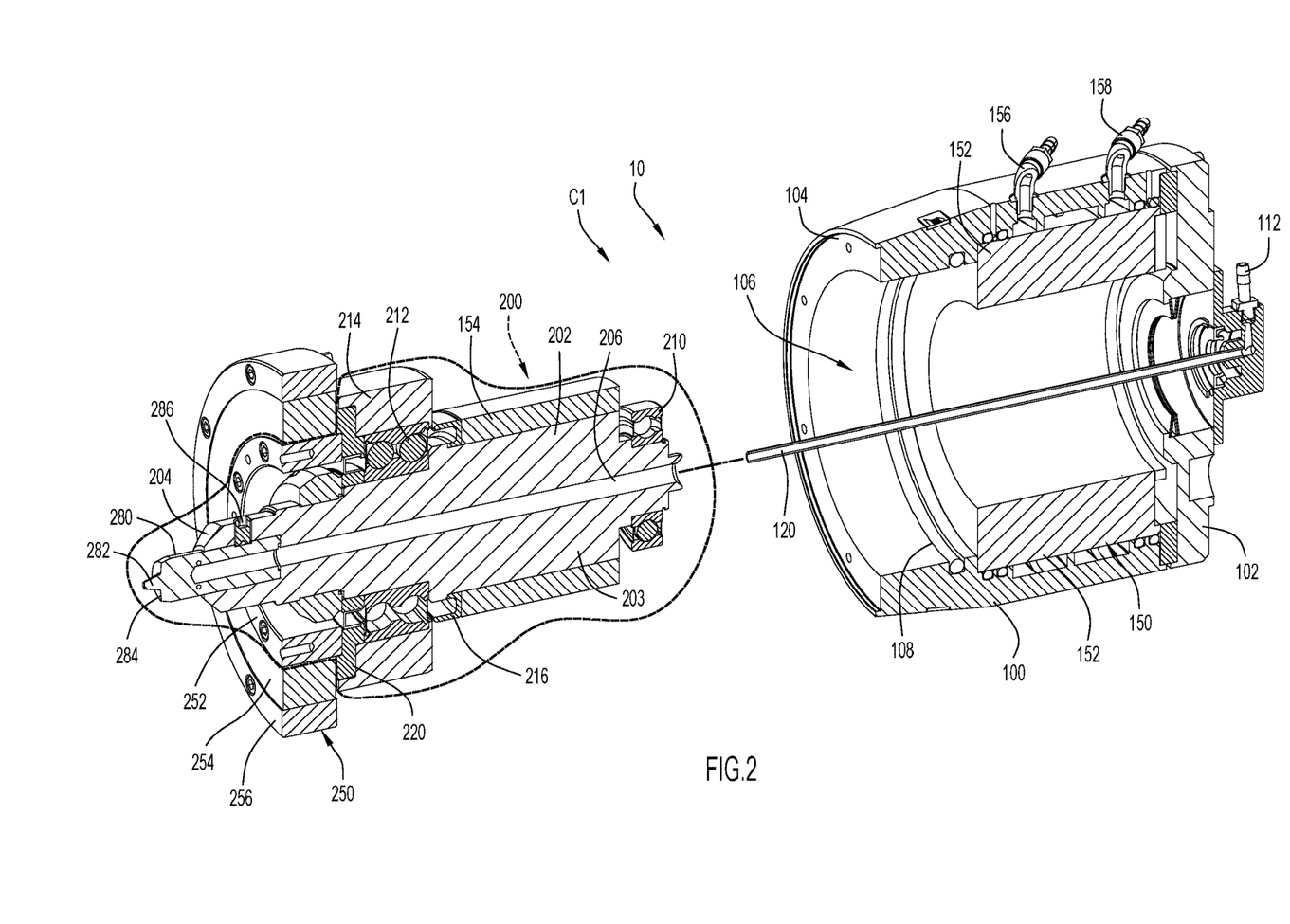
FIG. 2 is a partially exploded, sectional perspective view of the FSW head of FIG. 1, with the FSW head being shown in a sideways orientation.

First turning to FIG. 1, the head 10 includes a head housing 100 and an axle 202. The head housing 100 extends from a first or top end 102 to a second or bottom end 104. The top end 102 can be attached to a robot, gantry, or other such holding structure. Meanwhile, the bottom end 104 is open so that the housing 100 defines a closed-end bore 106 that is open at the second end 104, but closed at the first end 102, as is shown in FIG. 2. That is, the bottom 104 is an open, bottom end 104. The axle 202 is coaxial with a central axis of the housing 100 and extends through the bore 106 of the housing 100 in an axial or longitudinal direction so that the axle 202 extends beneath the bottom end 104 of the housing 100. An FSW tool 280 that defines a shoulder and pin/probe during FSW is coupled to a bottom end 204 of the axle 202 (the bottom end 204 may also be referred to as the welding or engagement end 204).

In the embodiment depicted in FIG. 1, an annular load cell 250 is also positioned beneath the bottom end 104, so that the load cell 250 is adjacent or proximate the engagement end 204 of the axle (and the tool 280). Generally, the load cell 250 generates load signals as a function of forces exerted on the engagement end 204 of the axle 202 (by way of the tool 280). In other words, and as is explained in further detail in connection with FIGS. 4 and 8, as the tool 280 acts against a workpiece, the axle 202 will move slightly upwards (e.g., translate vertically about 0.1 mm, or more generally in the range of 0.01-1.0 mm) with respect to the housing 100, pushing or pulling a portion of the load cell 250 so that the load cell 250 generates load signals as a function of the longitudinal forces exerted on the bottom end 204 of the axle 202 (by way of the tool 280). By comparison, many other FSW solutions include load cells above the welding head 10 (e.g., at or adjacent top end 102), which may create inaccuracies in the load signals generated by the load cell 250 (due to the distance between the point where the force is exerted and the point where the signals are generated).

Any signals generated by the load cell may be transmitted to a controller 40, which converts the load signals into force measurements (e.g., digital data) that can be used to control the FSW operations and ensure a high-quality weld. That is, the controller may accumulate data from the load signals and determine whether the downward force applied to the FSW head needs to be altered, for example, to ensure complete penetration with the FSW tool 280. Force measurements can be taken continuously and are used to maintain the force at a desired level throughout the welding process to produce a smooth surface and desired characteristics of the weld. Depending on the requirements of a particular welding process or workpiece, the target force level can be programmed to vary during sections of a weld. Further, the force measured throughout a welding process can be recorded (e.g., the force can be recorded on a time basis or as a function of the position of the welding head relative to the workpiece). Optionally, controller 40 can be configured to generate a visual or aural warning in the event the force deviates from a target force level.

Still referring to FIG. 1, overall, the welding head 10 is compact and does not require external forces (e.g., from a spindle drive/actuator, etc.). That is, the welding head 10 has relatively small external dimensions and may be a relatively self-contained FSW head, insofar as the head may operate without an external drive mechanism (but may still need to be coupled to a power source, controller, and/or a holding device, such as a gantry). As an example of the external dimensions of the welding head 10, the welding head 100 may have an external diameter in the range of approximately 100 mm to approximately 500 mm and an external longitudinal dimension (e.g., a height) in the range of approximately 200 mm to approximately 1,000 mm. As one specific example, for a typical welding thickness up to 12 mm, the welding head 100 may have an external diameter of approximately 250 mm and an external longitudinal dimension (e.g., a height) of approximately 325 mm. This compact design reduces deviation (bend) created on a holding structure (robot, gantry, etc.) and also minimizes the chances of the head 10 colliding with portions of the workpiece, portions of a holding structure, or other such objects during FSW operations.

FIGS. 2 and 3 show a more detailed description of the components included in head 10. In FIG. 2, the head 10 is shown with components removed from the housing 100 to illustrate the portions of the head 10 that are "floating" with respect to the housing. For clarity, in FIG. 2, the floating components 200, which include the axle 202, upper bearing 210, lower bearing 212 (and the lower bearing housing 214), a spacer 216, a connecting ring 220, an inner ring 252 of the load cell 250, and a rotor 154 of the motor assembly 150 are shown within a dashed line. Notably, although the inner ring 252 of the load cell 250, as well as a rotor 154 (which is part of motor 150), are coupled to and move with the floating components 200 (and, thus, may be considered floating components) the entirety of the load cell 250 and the entirety of the motor assembly 150 are not floating with the axle 202. Instead, the motor 150 and load cell 250 each include portions that are fixed to the head housing 100 (a stator 152 and an outer ring 256, respectively). FIG. 3 shows the same sectional view as FIG. 2 (albeit rotated 90 degrees), but with the head 10 fully assembled.

In the embodiment depicted in FIGS. 2 and 3, the head housing 100 includes a rotational motor 150 with a stator 152 that is fixedly coupled to the head housing 100 and a rotor 154 that is fixedly coupled to a central portion of the axle 202, between the upper bearing 210 and the lower bearing 212. The rotor 154 may be mechanically spaced from the lower bearing 212 and the load cell 250 by a radial spacer 216 to ensure that the rotor 154 does not become magnetically stuck and/or damaged when the lower bearing 212 is serviced. Meanwhile, the stator 152 is fixed to the head housing 100 and can be liquid cooled via inlet/outlet 156 and inlet/out 158 (one of items 156 and 158 will be an inlet and the other is an outlet, but flow may be reversible; thus, each is labeled as inlet/outlet). Generally, the motor 150 may impart rotational motion to the axle 202 (and, thus, to the tool 280).

At a high level, the axle 202 is a rotatable body that extends from (or through) the top end 102 of the housing 100 to (or through/out of) the bottom end 104 of the housing 100. The axle 202 may be substantially cylindrical; however, the axle may also include various steps, depressions, receptacles, and other such features that allow the axle to be floatingly secured within the head housing 100, insofar as "floatingly secured" means that the axle 202 is laterally secured (so that the axle cannot tilt or translate laterally), but movable axially within the head housing 100. For example, in the embodiment depicted in FIGS. 1-7, the axle 202 includes various steps (e.g., sections of different diameters) that secure the axle laterally without preventing axial movement of the axle 202. In the embodiment depicted in FIGS. 2 and 3, the axle 202 is widest at a central segment 203 that is configured to engage the motor assembly 150. Moreover, to ensure the central segment 203 remains engaged with the motor assembly 150 (or more specifically, that rotor 154 remains engaged with stator 152), the bottom end (leftmost end in FIG. 2) of the central segment 203 includes a peripheral flange that extends between the lower bearing 212 and radial spacer 216. Moving downwards (or right to left in FIG. 2) from central segment 203, the axle 202 may include a number of diameter reducing steps that may serve to laterally lock various components into place between the axle 202 and head housing 100 and/or that simply reduce the diameter of axle 202 towards the lower end 204 of the axle 202, where tool 280 is secured to the axle 202.

To secure the tool 280, the lower end may include an axial cavity sized to receive a body of the tool 280. The cavity may have any desirable size and may also include a locking feature 286, such as a threaded screw, that allows any desirable tool 280 to be secured to the axle 202. The tool 280 protrudes (e.g., extends downwards) from the lower end 204 of axle 202 and defines a shoulder 284 and a pin or probe 282 that will create a joint in or between one or more workpieces. In the depicted embodiment, the shoulder 284 is substantially orthogonal to the axial direction (the direction in which pin 282 extends) and the pin 282 has a truncated conical shape; however, in other embodiments, the operating end of the tool 280 may have any desirable shape and/or include any desirable features (e.g., the pin may include threads). Additionally, in other embodiments, the pin 282 may be movable with respect to the shoulder 284 (e.g., retractable) and/or include any other FSW features now known or developed hereafter.

Additionally, in the depicted embodiment, the axle 202 includes an internal bore or passage 206. The passage 206 is configured to align with cooling features included in the tool 280 and with coolant delivery features included in the head housing 100. For example, in the depicted embodiment, the top end 102 of the head housing 100 includes an inlet 112 and an outlet 114 for gas or liquid coolant. Coolant delivered via inlet 112 enters the passageway 206 via conduit 120 so that the coolant contacts the tool 206 and axle 202 adjacent the lower end 204 of the axle 202. Then, the coolant travels upwards, around the conduit 120 and exits the passageway 206 via the outlet 114. However, in other embodiments, the head 10 may include any desirable cooling features to cool the axle 202 and/or the tool 280.

Still referring to FIGS. 2 and 3, the upper bearing 210 (or at least a housing including bearing 210) and the lower bearing 212 (or at least a housing including bearing 210) are also coupled (e.g., an inner edge of the bearing is fixedly coupled to the axle 202) to the axle 202 so that the axle 202 (and the tool 280) can spin with respect to the housing 100 as the motor 150 rotates the axle 202. The upper bearing 210 is disposed above the motor 250 and the lower bearing 212 is disposed below the motor 150 to minimize friction immediately adjacent the motor 250. As can be seen in FIG. 3, in the depicted embodiment, the upper bearing 210 is biased longitudinally upwards by biasing member 211. This biasing may ensure that the axle 202 remains axially fixed during servicing of bearings, the load cell, and/or any other component (or when not in use). In other embodiments, the head 10 need not including biasing member 211; however, if the head 10 includes biasing member 211, the load cell 250 may calibrate for this biasing by zeroing out prior to an FSW operation.

The lower bearing 212 is supported by a supplemental bearing housing 214 that is disposed coaxially outward from the bearing 210. Bearing housing 214 extends substantially between the lower bearing 212 and the head housing 100 so that the bearing housing is adjacent the housing 100 (although some clearance may be provided between the head housing 100 and the bearing housing 214 so that the housing 214 does not get stuck on the head housing 100 due to swelling from heat generated during FSW operations). Due to this position, the bearing housing 214 may be accessible via an access panel 215 (see FIG. 5) included in the housing 100 so that bearing 212 can be serviced/replaced without disassembling any other components of the head 10. The head housing 100 may also include an O-ring 108 configured to support and center the bearing housing 214.

Still referring to FIGS. 2 and 3, but now with reference to FIG. 4 as well, the connector ring 220 is coupled to and extends between the load cell 250 and the bearing housing 214. More specifically, in at least some embodiments, the connector ring 220 is fixedly coupled to the inner ring 252 of the load cell 250 and fixedly coupled to the bearing housing 214. Alternatively, the connector ring 220, the inner ring 252 of the load cell 250, and the bearing housing 214 may be formed integrally (i.e., as one piece), which might decrease the overall height (longitudinal dimension) of the head 10. Regardless, the bearing housing 214 is fixedly coupled to the axle 202 (via bearing 212) and, thus, the connector ring 220 ensures that that inner ring 252 of the load cell 250 moves or floats with the axle 204. On the other hand, the inner ring 252 is also flexibly coupled, via a flexible portion 254, to the outer ring 256 of the load cell, which is fixedly coupled to the head housing 100. Thus, any "floating" of the axle may cause the load cell 250 to generate load signals due to the relative movement of the inner ring 252 with respect to the outer ring 256.

For example, in the example embodiment depicted in FIGS. 1-4, when the tool 280 is acting on one or more workpieces, the axle 202 will float upwards and pull the inner ring 252 upwards with respect to the outer ring 256, as is demonstrated by force path P1. As is shown in FIG. 4, force path P1 generates a force F1 in the load cell 250, thereby causing the load cell 250 to generate load signals. The load signals may be transmitted upwards through the head 10 via a transmission member 258, so that a data connection can transfer the signals from the head 10 to the controller 40 (see FIG. 1). In the depicted embodiment, the axle 202 (and any other floating components 200 fixedly coupled to axle 202) may move approximately 0.1 mm. This small amount of axial movement is sufficient for the load cell 250 (e.g., a column load cell) to measure axial (e.g., longitudinal) forces being applied to the tool 280.

Now turning to FIGS. 5-7, the FSW head 10 is shown when reconfigured into a stationary shoulder configuration C2. Notably, due to the placement of the load cell 250 and the floating components 200, the head 10 can easily be reconfigured from a rotating shoulder configuration C1 (FIGS. 1-4) to a stationary shoulder configuration C2. To effectuate the change, a stationary shoulder housing 300 is simply coupled to the inner ring 252 of the load ring 250 with a single operation. No components need to be removed from the head 10 during this single operation. Since this change in configurations is relatively straightforward, only the differences between FIGS. 5-7 and FIGS. 1-4 are discussed below and any description of like parts included above is to be understood to apply to the components shown in FIG. 5-7 unless differences are described below.

Most notably, since the stationary shoulder housing 300 (e.g., a "bell housing") is installed over the lower end 204 of the axle 202, the axle 202 is no longer visible from an exterior of the head 10 (as shown in FIG. 5). In fact, even the shoulder 284 of the tool 280 is obscured from an exterior of the head 10 and, instead, the stationary shoulder housing 300 provides a stationary shoulder 302 for the pin 282, which protrudes from a small opening 304 included at a center of the bottom of the stationary shoulder housing 300.

Still referring to FIGS. 5-7, but now with an emphasis on FIGS. 6 and 7, when the stationary shoulder housing 300 is coupled to the head housing 100, it is connected to the inner ring 252 of the load ring 250 via a connector 320. Consequently, if upward pressure is applied to the stationary shoulder 300 (e.g., at shoulder 302), the stationary shoulder 300 will push directly on the inner ring 252 of the load cell 250. Since the inner ring 252 is coupled to the floating axle 202, the inner ring 252 can float (e.g., move vertically) upwards, at least slightly, with respect to the outer ring 256 and cause the load cell 250 to generate load signals. More specifically, when the tool 280 is acting on one or more workpieces, upward force will be applied to the load cell along force path P2, as is shown in FIG. 7. Force path P2 generates a force F2 in the load cell 250 (like path P1 generating a force F1, except now the force is generated via pushing directly on the load cell instead of pulling indirectly on the load cell), thereby causing the load cell 250 to generate load signals. Again, the load signals may be transmitted upwards through the head 10 via a transmission member 258, so that a data connection can transfer the signals from the head 10 to the controller 40 (see FIG. 5). As mentioned, in the depicted embodiment, the axle 202 (and any other floating components 200 fixedly coupled to axle 202) may move approximately 0.1 mm and this small movement is sufficient for the load cell 250 to measure axial (e.g., longitudinal) forces being applied to the tool 280.

Figure 8:
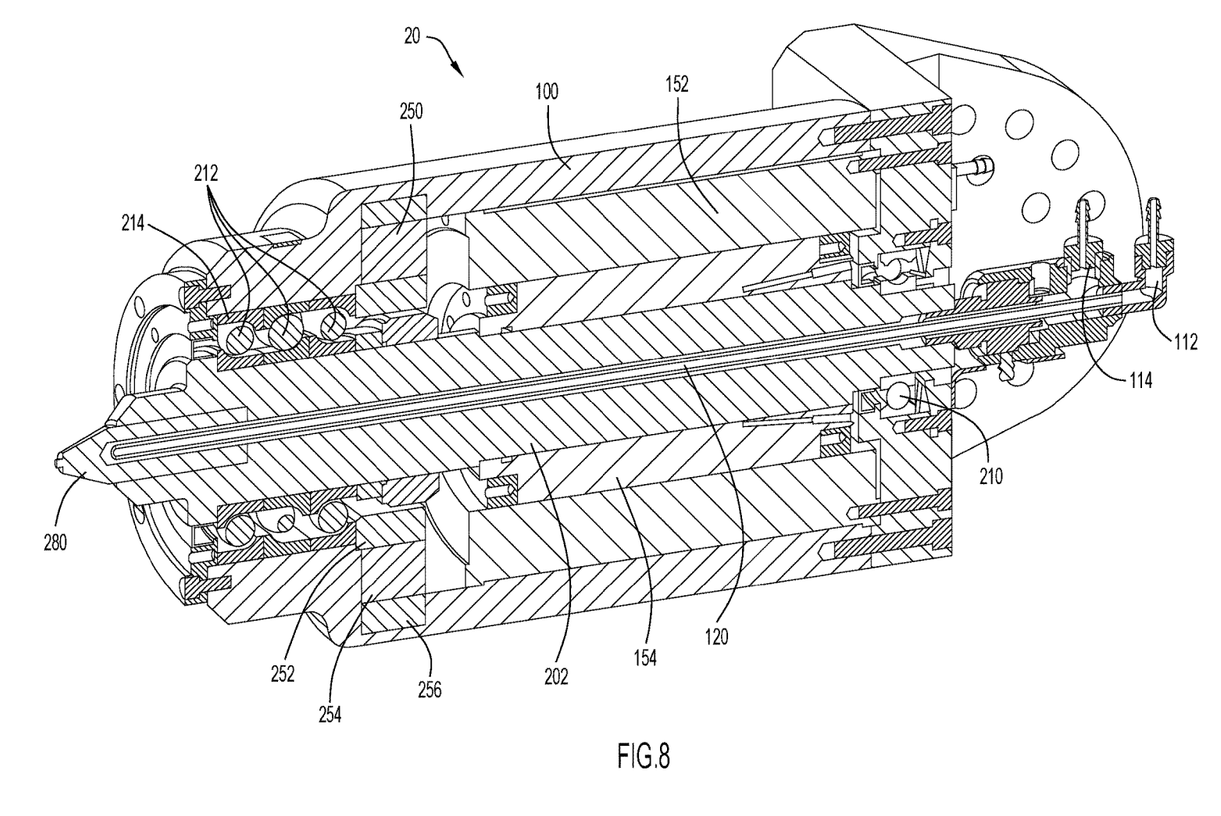
FIG. 8 is a sectional perspective view of an FSW head, according to a second example embodiment of the present disclosure, with the FSW head being shown in a sideways orientation.

Now turning to FIG. 8, which illustrates another embodiment of an FSW head 20 with improved axial force measurement. Although the embodiment depicted in FIG. 8 is a different embodiment as compared to the embodiment shown in FIGS. 1-7 (as opposed to a reconfiguration), the embodiment shown in FIG. 8 is still quite similar to the embodiments shown in FIGS. 1-7. Consequently, the differences between FIG. 8 and FIGS. 1-7 are discussed below and any description of like parts included above is to be understood to apply to the components shown in FIG. 8 unless differences are described below.

For example, in the embodiment illustrated in FIG. 8, the axle 202 has a different shape than embodiments shown in FIGS. 1-7, but, overall, the axle 202 is still a floating axle; thus, any description of the floating axle 202 included above (aside from descriptions of the shape of the axle in FIGS. 1-7) is applicable to the axle 202 shown in FIG. 8. In FIG. 8, the most notable difference from FIGS. 1-7 is that the load cell 250 has been moved from the bottom end 104 of the head housing 100 to a location between the motor assembly 150 and the lower bearing 212 (which now includes three rows of bearings, as opposed to two, but otherwise operates, and is accessible, in the same manner as bearing 212 from FIGS. 1-7). This location may provide protection for the load cell 250 and may still be sufficient to generate load signals during rotating shoulder FSW operations. For example, during rotating shoulder FSW, the relative movement of the axle 202 and the lower bearings 212 with respect to the head housing 100 (and the outer ring 256 of the load cell 250) generates an upward axial force (left to right in FIG. 8) on the inner ring 252 of the load cell 250, which causes the load cell to generate load signals. However, due to this location it may not be possible to reconfigure head 20 for stationary shoulder FSW since the shoulder would not be able to apply a direct force to the load cell 250 (e.g., stationary shoulder housing 300 could not be coupled to and act on the load cell 250).

The FSW head presented herein provides a number of advantages. For example, the FSW head presented herein provides a compact and largely self-contained FSW head that can operate on various holding structures (e.g., a gantry, robot, etc.) while minimizing the chances of colliding with workpieces, parts of a holding structure or any other objects. The compact size of the FSW head presented herein also ensures that the FSW head is stiff and study while reducing the odds that the FSW head will cause a deviation (e.g., bend) in a holding structure (e.g., a gantry, robot, etc.). Moreover, the FSW provides improved measurement of axial forces (e.g., forces acting along the central axis of the welding head, such as upward or downward forces) because the path between the load cell and the FSW tool is greatly reduced, especially as compared to solutions that position a load cell above the FSW head. The path reduction results in improved accuracy which, in turn, allows a controller to provide improved (e.g., more accurate) operational parameters (e.g., travel speed, downward force, etc.) that create higher quality welds.

Still further, in at least some embodiments, the FSW head provides improved serviceability at least because the load cell and the lower bearings are easily accessible. Thus, the load cell and/or the lower bearings may be accessed and repaired/replaced without extensive deconstruction of the welding head. For example, the load cell and/or the lower bearings may be replaceable without removing the FSW head from a holding structure (e.g., a gantry, robot, etc.). Furthermore, in at least some embodiments (e.g., the embodiment shown in FIG. 1-7), the FSW head presented herein is advantageous because it may quickly and easily be reconfigured between a configuration suitable for rotating shoulder FSW and a configuration suitable for stationary shoulder welding (i.e., by simply installing or removing a stationary shoulder housing onto the FSW head).

To summarize, in one form, a FSW head is provided, the FSW head comprising: a head housing that extends from a top end to an open bottom end and defines a bore extending between the top end and the open bottom end; and an axle that is coaxial with and rotatable within the bore, the axle being laterally secured within the head housing and axially movable with respect to the head housing, the axle including an engagement end that extends beyond the open bottom end of the head housing and supports an FSW tool that is configured to rotate with the axle to effectuate friction stir welding operations.

In another form, an FSW head is provided comprising: a head housing that extends from a top end to an open bottom end and defines a bore extending between the top end and the open bottom end; one or more floating components configured to support an FSW tool, the one or more floating components being axially movable with respect to the head housing; and a load cell disposed beneath the open bottom end of the head housing, the load cell being configured to generate load signals in response to axial movement of the floating components.

In yet another form, a method of friction stir welding is provided, the method comprising: providing a head housing that extends from a top end to an open bottom end and defines a bore extending between the top end and the open bottom end; installing a floating axle in the head housing, the floating axle including an engagement end that extends beyond the open bottom end, the engagement end supporting an FSW tool; installing a load cell on the open bottom end of the head housing; controlling friction stir welding with the tool based on load signals generated by the load cell.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

I claim:

1. A friction stir welding head, comprising:
a head housing that extends from a top end to an open bottom end and defines a bore extending between the top end and the open bottom end;
an axle that is coaxial with and rotatable within the bore, the axle being laterally secured within the head housing and axially movable with respect to the head housing, the axle including an engagement end that extends beyond the open bottom end of the head housing and supports a friction stir welding tool that is configured to rotate with the axle to effectuate friction stir welding operations; and
a load cell that is disposed beneath the open bottom end of the head housing and configured to generate load signals in response to axial movement of the axle, the load cell including an inner ring and an outer ring, the inner ring being fixedly coupled to the axle and movably coupled to the outer ring via a flexible portion, wherein relative movement of the inner ring with respect to the outer ring causes the load cell to generate the load signals.

2. The friction stir welding head of claim 1, further comprising:
a motor assembly configured to rotate the axle within the bore and with respect to the head housing.

3. The friction stir welding head of claim 1, wherein the load cell is disposed between the open bottom end of the head housing and the friction stir welding tool supported by the engagement end of the axle.

4. The friction stir welding head of claim 1, wherein the friction stir welding tool comprises:
a pin; and
a shoulder that rotates with the pin to effectuate the friction stir welding operations, wherein upward forces on the shoulder are translated to the inner ring to move the inner ring with respect to the outer ring and cause the load cell to generate the load signals.

5. The friction stir welding head of claim 4, further comprising:
a lower bearing that allows the axle to rotate with respect to the head housing, the lower bearing being coupled to the inner ring via one or more floating components or formed with the inner ring and the one or more floating components, wherein the upward forces on the shoulder translate to the inner ring via the lower bearing and the one or more floating components.

6. The friction stir welding head of claim 1, wherein the friction stir tool comprises:
a pin; and
a shoulder that is covered by a stationary shoulder, wherein upward forces on the stationary shoulder are translated to the inner ring to move the inner ring with respect to the outer ring and cause the load cell to generate the load signals.

7. The friction stir welding head of claim 6, wherein the upward forces translate directly from the stationary shoulder to the inner ring.

8. A friction stir welding head, comprising:
a head housing that extends from a top end to an open bottom end and defines a bore extending between the top end and the open bottom end;
one or more floating components configured to support a friction stir welding tool, including an axle that is coaxial with the bore, one or more bearings that allow rotation of the axle within the bore, and a connector ring, each of the one or more floating components being axially movable with respect to the head housing; and
a load cell disposed beneath the open bottom end of the head housing, the load cell being configured to generate load signals in response to axial movement of the floating components wherein the connector ring connects a particular bearing of the one or more bearings to the load cell.

9. The friction stir welding head of claim 8, wherein the one or more floating components further comprise:
an inner ring of the load cell, the inner ring being fixedly coupled to the axle via at least the connector ring and movably coupled to an outer ring of the load cell via a flexible portion so that relative movement of the inner ring with respect to the outer ring causes the load cell to generate the load signals.

10. The friction stir welding head of claim 8, wherein the one or more floating components further comprise:
a rotor of a motor assembly, the rotor being movable by a stator that is fixedly coupled to the head housing to effectuate rotation of the axle within the bore.

11. The friction stir welding head of claim 8, wherein the particular bearing is a lower bearing disposed between the load cell and a motor assembly included in the friction stir welding head.

12. The friction stir welding head of claim 11, wherein the lower bearing further comprises:
a supplemental bearing housing that is disposed coaxially outward from the lower bearing and is accessible via an access panel included on the head housing.

13. The friction stir welding head of claim 8, wherein the friction stir welding head is reconfigurable between a rotating shoulder configuration and a stationary shoulder configuration with a single installation operation.

14. A method of friction stir welding, comprising:
providing a head housing that extends from a top end to an open bottom end and defines a bore extending between the top end and the open bottom end;
installing a floating axle in the head housing, the floating axle being laterally secured within the head housing and axially movable with respect to the head housing, the floating axle including an engagement end that extends beyond the open bottom end, the engagement end supporting a friction stir welding tool that is configured to rotate with the floating axle to effectuate friction stir welding operations;
installing a load cell on the open bottom end of the head housing, the load cell including an inner ring and an outer ring, the inner ring being fixedly coupled to the floating axle and movably coupled to the outer ring via a flexible portion, wherein relative movement of the inner ring with respect to the outer ring causes the load cell to generate load signals; and controlling friction stir welding with the friction stir welding tool based on the load signals generated by the load cell in response to axial movement of the floating axle.

15. The method of friction stir welding of claim 14, wherein the friction stir welding is rotating shoulder friction stir welding and the method further comprising:

transitioning to stationary shoulder friction stir welding by installing a stationary shoulder housing onto the load cell.

16. The method of friction stir welding of claim 15, wherein the stationary shoulder housing covers a shoulder of the friction stir welding tool and the transitioning is complete after a single operation.

17. The method of claim 14, further comprising:

installing one or more floating components with the floating axle, the floating axle and the one or more floating components being axially movable with respect to the head housing.

18. The method of claim 17, wherein the one or more floating components comprise:

one or more bearings that allow rotation of the floating axle within the bore;

a connector ring that connects a particular bearing of the one or more bearings to the load cell; and a rotor of a motor assembly, the rotor being movable by a stator that is fixedly coupled to the head housing to effectuate rotation of the floating axle within the bore.

\* \* \* \* \*